April 4, 1944. J. P. GOEBEL 2,345,703
LOCOMOTIVE CAB WINDOW
Filed April 21, 1942
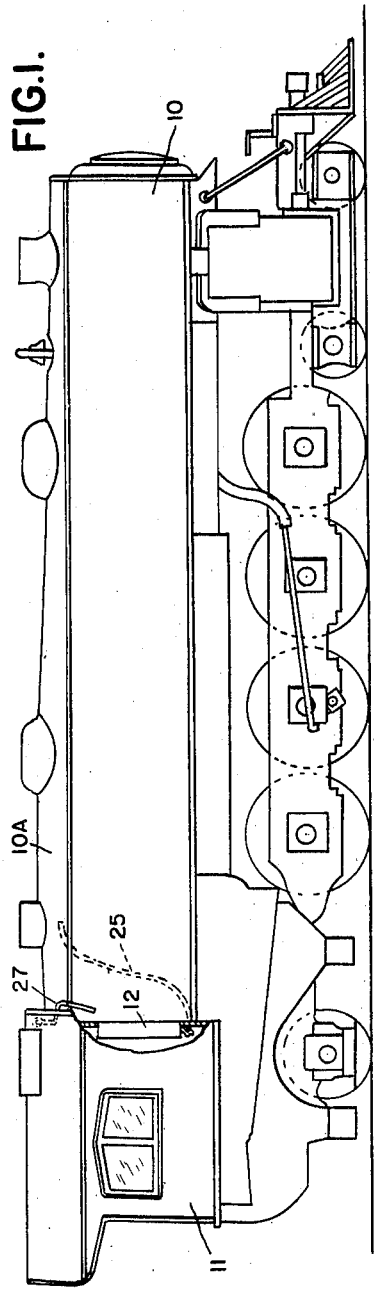
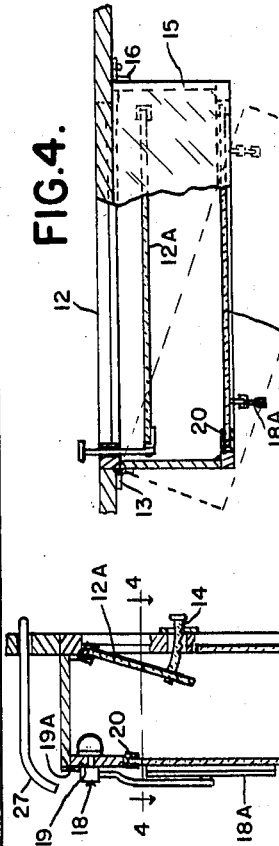
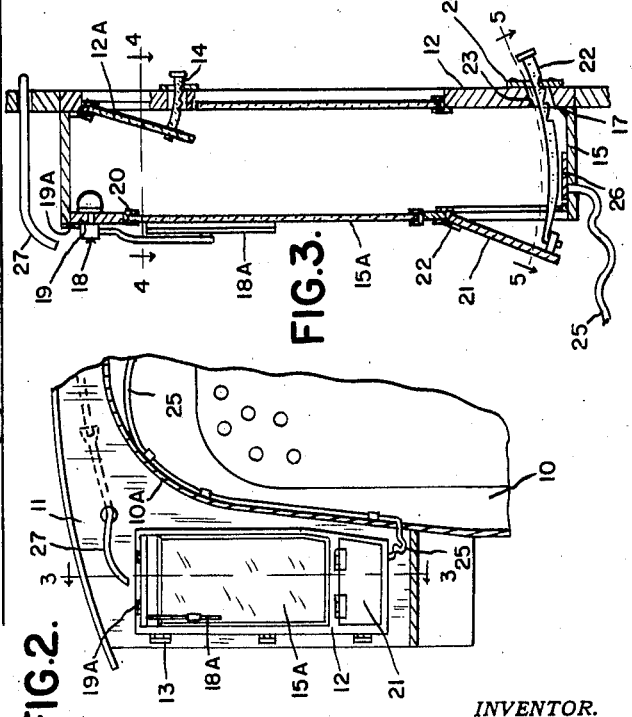
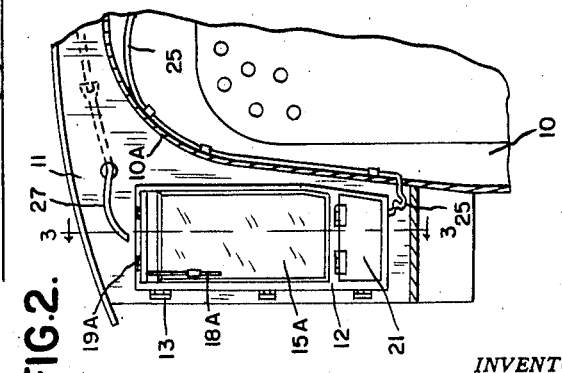
INVENTOR.
JOSEPH P. GOEBEL
BY Swan, Frye & Hardesty
ATTORNEYS Patented Apr. 4, 1944

2,345,703

UNITED STATES PATENT OFFICE 2,345,703

LOCOMOTIVE CAB WINDOW

Joseph P. Goebel, Detroit, Mich.

Application April 21, 1942, Serial No. 439,898

2 Claims. (Cl. 20—40.5)

This invention relates to locomotives, and has for its principal object the provision of an improved window for locomotive cabs.

There has long been a need for improvement in locomotive cab windows, but practical difficulties and regulations of Interstate Commerce Commission have rendered it difficult to make substantial progress. For example, cross bars, or the like, that would impair vision throughout a portion of the window are barred by regulation, and adjustable or movable parts must be arranged so that they can be controlled from inside the cab, as on a fast moving train, one cannot go out on the running-board to make adjustments, and storms, rain and surface freezing will quickly impair and even prevent vision through the window before stoppage of the train permits readjustments, even if scheduled requirements permitted train stoppage. Heretofore, under bad weather conditions, it has been customary for the engineer to open cab windows and take a drenching in order to see ahead. One of the objects of my invention is to provide a locomotive cab window that will enable the engineer to make all necessary adjustments from the interior of the cab, and provide clear vision for himself at all times, but preventing formation of surface frost, dirtying by cinders, dust or mud, or clouding of the window during heavy rain and snow storms.

A further object of my invention is to provide a detachable outer window that will swing with the usual cab window to enable passage of persons from the cab to the running-board and return, and permit full vision throughout the entire length of the usual cab window.

Other objects and advantages will be apparent to those skilled in the art upon reference to the following description and the accompanying drawing in which Fig. 1 is a side elevation of a locomotive equipped with my improved locomotive cab window;

Fig. 2 is an enlarged front elevation of the window and adjacent locomotive engine and boiler portions;

Fig. 3 is a vertical section taken substantially on the line 3—3 of Fig. 2;

Fig. 4 is a cross section taken substantially on the line 4—4 of Fig. 3; and

Fig. 5 is a cross section taken substantially on the line 5—5 of Fig. 3.

Referring now to the drawing, reference numeral 10 designates a locomotive such as used on railways, and 11 the locomotive cab. At each side of the boiler of the locomotive is arranged a window or door 12 through which the occupants of a cab are enabled to see ahead of the train while being protected from the weather. This window 12 is comparatively long and narrow and is shaped to secure as much glass surface as possible while allowing for the inclined surface of the locomotive boiler hood 10A. This window 12 is pivoted on hinges 13 so as to open outwardly, and the uppermost portion 12A of the glass of the window 12 is separated from the major portion of the glass and mounted for swinging movement outwardly from the cab, somewhat after the manner of a transom.

A notched guide bracket 14 is arranged to maintain the swinging portion 12A of the window in desired angular positions.

The construction so far described is the usual cab window.

My improved locomotive cab window comprises a casing 15 shaped to conform with the cab window 12 and adapted to be mounted to swing outwardly on the same hinges 13 as the usual cab window. A latch 16 on the side opposite the hinges enables securing of the casing 15 to the cab window. The sides of the casing 15 may be of opaque material, such as wood or metal, but the back of such casing 15 is open, and the front of casing 15 is formed of a pane, 15A, of glass which is arranged in grooves in the sides of the casing to enable sliding of the pane 15A from the top of the casing whenever breakage makes it necessary to replace panes. The inner edges of the casing 15 are provided with weatherstrip material 17 and at least one side of the grooves positioning the pane 15A is cushioned with rubber or weatherstrip material so as to enable close fitting of both the casing 15 against the usual cab door and of its pane 15A within the sides of the casing.

Above the window pane 15A is arranged a window wiper 18 suitably connected for operation from the compressed air tank of the locomotive whenever desired, the blade 18A being preferably arranged to reciprocate horizontally across the upper portion of the window pane 15A. The window wiper 18 is preferably mounted on a cross bar 19 pivotally connected, as by the hinge 19A, with the top of the casing 15, whereby the cross bar 19 of the attached window wiper mechanism may be swung out of the way whenever it is necessary to remove a broken pane 15A and replace a new one. Preferably I provide a channel 20 of rubber or cushioned metal to fit the top of pane 15A and against the upper portion of which channel the lower edge of the cross bar 19 will impinge when in its lowered position. This arrangement not only serves to hold the window pane 15A against rattling, but also provides an anchor for maintaining the desired position of the cross bar 19 and attached window wiper mechanism.

Below the pane 15A and in substantial alignment therewith when in its closed position, I mount an air inlet door 21, pivoted, as by the hinges 22, to swing outwardly from its normally closed position in alignment with the window pane 15A. The swinging movements of the member 21 may be controlled by a notched bar 22 pivotally connected to the member 21 adjacent its lower edge and extending through an enlarged aperture 23 in the lower frame portion of the usual cab window 12. A plate 24 is secured to the inner surface of the cab window 12 for cooperation with any of a series of notches in the actuating member 22, whereby any desired adjustment of the swinging member 21 may be secured. The aperture 23 is made sufficiently larger than the actuating member 22 as to permit swinging of the casing 15 on its hinges 13 relatively to the usual cab window. Since the preferred positioning of the actuating member 22 is relatively close to such hinges 13, the play demanded can readily be secured.

When the air inlet control member 21 is swung outwardly, substantially as shown in Fig. 3, air passes upwardly from adjacent the bottom of the casing 15 to adjacent the top of the usual cab window 12, entering the interior of the cab through the swinging upper portion 12A of such cab window. By adjusting the extent of opening, the air passage can readily be controlled, so that clouding of the panes in the window 12 and casing 15 can be effectively prevented. Means are also provided to prevent frosting of these panes by admitting heated air to the interior of the casing 15 whenever desired.

As shown herein, a flexible tube 25 has one extremity secured in the floor of the casing 15 and then passes through the hood 10A of the locomotive and extends to a position between the hood and boiler where the air is heated. A shutter 26 is pivotally mounted in position to normally cover one extremity of the tubing 25. When it is desired to admit heated air to the interior of the casing 15, it is only necessary to swing the shutter 26 to uncover one extremity of the tubing 25, whereupon the entraining action of the inrushing air through the gap formed below the air inlet control member 21, will draw heated air into the casing through the tubing 25. That portion of the tubing exteriorly of the locomotive hood 10A is preferably coiled or kinked sufficiently to permit swinging movement of the casing 15 without detaching the tubing therefrom.

I also provide means for ready washing of the outer surface of the window pane 15A whenever desired. As herein shown, a tubing 27 is mounted above the locomotive window 12 and extends sufficiently forward thereof to enable spraying of water onto the window pane 15A, without obstructing the swinging movements of the locomotive cab window 12 and attached casing 15. The inner extremity of the tubing 27 extends within the cab to the fireman's side of the cab, where it terminates in a funnel (not shown) for the reception of the nozzle of the usual deck-hose. Whenever cinders, mud, etc., becomes encrusted on the window pane 15A, or a driving sleet storm or the like threatens to curtail vision through the window pane, it is only necessary to spray or eject water from the deck-hose through the tube 27. The motion of the train will spray the water onto the window pane 15A and the movements of the wiper mechanism will then cleanse the window. Ordinarily the window wiper mechanism will serve to maintain sufficient vision, but additional water may be sprayed through the tubing 27 whenever it becomes necessary.

Operation of my improved locomotive cab window is believed apparent. The casing 15 may be secured to swing with the usual locomotive cab window 12 lessening the swinging movements of the upper transom-like portion 12A thereof. Vision is permitted through the pane in the window 12 and the pane 15A of the casing. Frosting, clouding, etc. of the window panes is prevented by the up-sweep of air entering at the lower portion of the casing 15 and passing into the cab through the swinging window portion 12A. The interior of the casing can also be heated to curtail frosting. The exterior of the pane 15A may readily be cleansed and clear vision may be maintained therethrough by the action of the window wiper mechanism 18, and if cinders, mud, etc., become encrusted upon the pane 15A, water may be ejected through the tubing 27 onto the pane 15A where it is contacted by the wiper blade 18A. Provision is made for maintaining the swinging portions of the windows in desired adjusted positions, and frangible portions of my improved locomotive cab window can be readily replaced.

I am aware that the invention may be embodied in other specific forms without departing from the spirit or essential attributes thereof, and I therefore desire the present embodiment to be considered in all respects as illustrative and not restrictive; reference being had to the appended claims rather than to the foregoing description to indicate the scope of the invention.

I claim:

1. In combination with a locomotive having a boiler, a hood surmounting the boiler, and a cab behind the boiler, a cab window pivoted in the wall of the cab, the upper portion of which is movable to admit air into the cab, a removable storm window comprising a casing pivotally secured to the frame work of said cab window, a window pane mounted in the front wall of the casing, the lower portion of a wall of the casing below said pane having a gate therein swingable outwardly to admit air into the casing, means for holding said gate in various adjusted positions, and means for admitting air at ordinary atmospheric pressure and heated by the locomotive boiler into the interior of the casing adjacent said gate, comprising a tubing having one end positioned between the hood and boiler of the locomotive and the other end extending into the lower portion of said casing, whereby the entraining action of the air entering through such gate will aid in inducting the heated air through said tubing.

2. In combination with a locomotive cab window pivoted in the wall of the cab, the upper portion of which is movable to admit air into the cab, a removable storm window comprising a casing pivotally secured to the frame work of said cab window, a window pane mounted in the front wall of the casing, the lower portion of a wall of the casing below said pane having a gate therein swingable outwardly to admit air into the casing, means for holding said gate in various adjusted positions, a cross bar pivotally mounted at the upper extremity of the front wall of the casing, and window wiper mechanism mounted on said cross bar and arranged for wiping the upper portion of the casing pane.

JOSEPH P. GOEBEL.